United States Patent
Cheng et al.

(10) Patent No.: US 9,380,020 B2
(45) Date of Patent: Jun. 28, 2016

(54) METHOD FOR MOBILE NODE TO DYNAMICALLY ACQUIRE LOCATION IDENTIFIER, AND LISP NETWORK

(71) Applicants: Li Cheng, Shenzhen (CN); Wen Luo, Shenzhen (CN); Jiong Shen, Shenzhen (CN); Mo Sun, Shenzhen (CN)

(72) Inventors: Li Cheng, Shenzhen (CN); Wen Luo, Shenzhen (CN); Jiong Shen, Shenzhen (CN); Mo Sun, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 181 days.

(21) Appl. No.: 14/355,255

(22) PCT Filed: Oct. 29, 2012

(86) PCT No.: PCT/CN2012/083694
§ 371 (c)(1),
(2) Date: Jun. 18, 2014

(87) PCT Pub. No.: WO2013/064049
PCT Pub. Date: May 10, 2013

(65) Prior Publication Data
US 2014/0297875 A1  Oct. 2, 2014

(30) Foreign Application Priority Data
Nov. 1, 2011  (CN) .......................... 2011 1 0339368

(51) Int. Cl.
*H04L 29/12*  (2006.01)
*H04W 40/02*  (2009.01)
(Continued)

(52) U.S. Cl.
CPC .......... *H04L 61/2015* (2013.01); *H04L 61/103* (2013.01); *H04L 61/2084* (2013.01); *H04L 45/64* (2013.01); *H04L 45/74* (2013.01); *H04L 61/20* (2013.01); *H04W 40/02* (2013.01)

(58) Field of Classification Search
None
See application file for complete search history.

(56) References Cited

U.S. PATENT DOCUMENTS 6,768,743 B1   7/2004  Borella et al.
7,450,560 B1   11/2008 Grabelsky et al.
(Continued)

FOREIGN PATENT DOCUMENTS

CN  101600196 A   12/2009
CN  102075420 A   5/2011
(Continued)

OTHER PUBLICATIONS

Farinacci, D. et al, "LISP for Multicast Environments," Oct. 17, 2011, Network Working Group, version 10.*
(Continued)

*Primary Examiner* — Thomas Dailey
(74) *Attorney, Agent, or Firm* — Ling Wu; Stephen Yang; Ling and Yang Intellectual Property

(57) ABSTRACT

A method for a mobile node dynamically obtaining a location identifier, and a locator/ID separation protocol (LISP) network are provided. The method is applied in the LISP network, including: when a mobile node moves to a new location, sending an address information allocation request including a first option to an address information allocation device, wherein the first option includes attribute information of which a value represents globally routable; after receiving the address information allocation request, the address information allocation device preferentially selecting globally routable address information in locally available address information resources, and then replying with an address information allocation response carrying the selected address information to the mobile node, wherein the address information includes an address or a routing prefix.

20 Claims, 4 Drawing Sheets

(51) Int. Cl.
*H04L 12/715* (2013.01)
*H04L 12/741* (2013.01)

(56) References Cited

U.S. PATENT DOCUMENTS

| | | |
|---|---|---|
| 2007/0180142 A1 | 8/2007 | Small |
| 2010/0208742 A1* | 8/2010 | Kafle ................ H04L 29/12028 370/401 |
| 2010/0316054 A1* | 12/2010 | Xu ...................... H04L 12/4633 370/392 |
| 2012/0131142 A1* | 5/2012 | Flinck ................... G06F 9/5016 709/217 |
| 2012/0155442 A1* | 6/2012 | Haddad ................. H04W 8/065 370/338 |

FOREIGN PATENT DOCUMENTS

| CN | 102088390 A | 6/2011 |
|---|---|---|
| EP | 1613022 A1 | 1/2006 |

OTHER PUBLICATIONS

Lewis, D. et al, "Interworking LISP with IPv4 and IPv6," Jun. 30, 2011, Network Working Group, version 2.*

International Search Report for PCT/CN2012/083694 dated Jan. 10, 2013.

"LISP Mobile Node"; D. Farinacci et al.; http://tools.ietf.org/id/draft-meyer-lisp-mn-06.txt; Network Working Group Internet-Draft, Informational; Apr. 26, 2012; XP55125124A.

"Improvements to LISP Mobile Node"; Michael Menth et al.; University of Wurzburg, Institute of Computer Science, Germany; 2010; Teletraffic Congress (ITC); XP31780097A.

* cited by examiner

METHOD FOR MOBILE NODE TO DYNAMICALLY ACQUIRE LOCATION IDENTIFIER, AND LISP NETWORK

TECHNICAL FIELD

The present document relates to the mobile communication field and the Internet field, and in particular, to a method for a mobile node dynamically obtaining a location identifier and a locator/ID separation protocol (LISP) network.

BACKGROUND OF THE RELATED ART

The LISP technology is a kind of solution based on the host identifier and host location identifier separation, as shown in FIG. 1, its realization way is as follows:

The site network (usually referring to the user network) is separated with the transmission network (usually referring to the operator network), and the address space is divided into an Endpoint Identifier (EID, representing an address within the site network) address space and a Routing Locator (RLOC, representing reachability within the edge router network) address space. The routing information within the side network, that is, EID address information, is not released to the transmission network, and two site networks are connected through the tunnel which is across the transmission network and established between an Ingress Tunnel Router (ITR) and an Egress Tunnel Router (ETR). The maintenance of the information of the mapping from the EID to the RLOC is realized through a single mapping system by the site network.

When the data need to be forwarded, the data package producer in the site network forwards the generated data package to the ITR, the ITR initiates a mapping request to the mapping system, to obtain a mapping relationship between the destination EID address and the RLOC address of the destination site ETR. The ITR caches the mapping relationship, and performs the LISP encapsulation on the data package according to the mapping relationship, and then sends the encapsulated data package to the ETR of the destination site through the tunnel. After performing the de-capsulation on the received data package, the ETR of the destination site forwards the data package to a receiver in the site according to the destination EID address carried in the data package.

As shown in FIG. 1, the mapping plane is illustrated by taking the Alternative Logical Topology (ALT) mapping system as an example, and the Map Resolver (MR) and the Map Server (MS) are used in the mapping system. Wherein, the MR is used for receiving a mapping request of the LISP encapsulation sent by the ITR, and sending the mapping request to a corresponding MS according to the EID prefix routing information in the mapping network; and the MS is used for storing the mapping information registered by the ETR, and forwarding the received mapping request to the corresponding ETR.

The related technology also involves the support to the mobility by the LISP technology. In the LISP mobility research, each Mobile Node (MN) can be regarded as an LISP site, and the MN can execute part of the functions of the ETR and the ITR. Therefore, one MN device maintains two identifications: one is the identifier of the MN, and the identifier usually is not changed; and another is the location identifier of the MN, and the MN can obtain the identifier dynamically when the MN moves to a new location. As the scene shown in FIG. 2, the identifier of the MN is indicated by the EID of the MN, and can be abbreviated as MEID. When the new location of the MN is in an LISP site, the location identifier obtained dynamically by the MN in the site is one EID in the site address space, indicated by the EID of that site, and abbreviated as SEID. The MN regards the obtained SEID address as the RLOC address, and registers the mapping relationship from the MEID to the SEID with the corresponding MS in the mapping system.

Based on the scene illustrated in FIG. 2, in the related technology, a correspondent Node of the MN, for example, one Static Node (SN) in some LISP site 1 as shown in FIG. 2, wants to establish a communication connection with the MN in the site 2. The location of the SN will not usually change in regard to the MN, and the location identifier will not usually change either. When the ITR in the site 1 receives the data package, sent by the SN, of which the destination address is the MEID, the ITR in the site 1 performs the mapping cache searching; if there is no mapping information corresponding to the MEID in the cache, then the ITR in the site 1 sends the mapping request to the mapping system, and obtains the mapping relationship from the MEID to the SEID through the MS corresponding to the MN. The ITR performs the LISP encapsulation on the data package according to the mapping relationship, and the destination address of the encapsulated data package is the SEID. If there is no mapping item corresponding to the SEID in the ITR cache, then the ITR needs to visit the mapping system again to obtain the mapping information from the SEID to the RLOC address of the ETR of the LISP site where the MN locates (ETR RLOC, abbreviated as ERLOC), and performs the LISP encapsulation again on the above-mentioned encapsulated data package according to the mapping information, and then sends out the data package. Therefore in the scene illustrated in FIG. 2, the ITR may need to perform the mapping searching twice, and needs to perform two layer-LISP encapsulations on the data package which is sent to the MN by the SN.

It needs to be illustrated that in the above-mentioned scene, besides the SN in the LISP site, the correspondent Node which wants to establish a communication connection with the LISP MN can also be the MN in the LISP site, the SN in the non-LISP field, or the MN in the non-LISP field. When the correspondent Node is the SN in the non-LISP field, the processes of twice-mapping searching and two layer-LISP encapsulation are performed by the Proxy ITR (PITR) device; and when the correspondent Node is the MN in the non-LISP field, the processes of twice-mapping searching and two layer-LISP encapsulation are all completed by the sender MN itself; when the correspondent Node is the MN in the LISP site, the sender MN of the data package obtains the mapping information from the MEID to the SEID of the destination MN at first, performs the LISP encapsulation on the data package, then sends the encapsulated data package to the ITR of the site where the present MN locates according to the default setting, and the ITR obtains the mapping information from the SEID to the ERLOC and then performs the second layer LISP encapsulation on the data package.

Based on the above-mentioned scenes, if the LISP MN moves to a new LISP site each time and obtains the EID of the site as the location identifier, when the correspondent Node outside the site initiates a connection to the MN for the first time, the processes of twice-mapping searching and twice-mapping encapsulation are all required to be performed, which causes the waste of the system resources and will increase the overhead of the message transmission after multiple encapsulations.

SUMMARY OF THE INVENTION

The embodiment of the present document provides a method for a mobile node dynamically obtaining a location identifier and an LISP network, to solve the disadvantage of wasting of system resources and increasing of message transmission overhead caused by the current correspondent Node sending the data package to the destination MN.

In order to solve the above-mentioned problem, the embodiment of the present document provides a method for a mobile node dynamically obtaining a location identifier, applied in a locator/ID separation protocol (LISP) network, comprising:

when a mobile node moves to a new location, sending an address information allocation request carrying a first option to an address information allocation device, wherein, the first option comprises attribute information of which a value represents globally routable; and after receiving the address information allocation request, the address information allocation device preferentially selecting globally routable address information in locally available address information resources, and then replying with an address information allocation response carrying the selected address information to the mobile node, wherein, the address information comprises an address or a routing prefix.

Preferably,
the address information allocation response also carries attribute information of the selected address information.

Preferably, the method further comprises:
the mobile node constructing a location identifier of itself by utilizing received address information allocated by the address information allocation device for the mobile node.

Preferably,
when the LISP network is an IPv4 network, and when the mobile node interacts with the address information allocation device by adopting a point-to-point protocol, the address information allocation request is a network control protocol configuration request, the address information allocation response is a network control protocol configuration response, and the address information allocation device is a correspondent Node which performs point-to-point protocol communication with the mobile node.

Preferably,
when the LISP network is an IPv4 network, and when the mobile node interacts with the address information allocation device by adopting a dynamic host configuration protocol (DHCP), the method comprises:

when the mobile node moves to a new location, broadcasting a DHCP discover message carrying a second option, wherein, the second option comprises attribute information of which a value represents globally routable; and a DHCP server receiving the DHCP discover message preferentially selecting globally routable addresses from available address resources configured locally, and then replying with a DHCP offer message carrying the selected address to the mobile node.

Preferably, the method further comprises:
the mobile node selecting one of received addresses as a location identifier of itself, and then broadcasting a DHCP request message which carries identification information of an allocator DHCP server of the selected address, the selected address, and attribute information of the selected address.

Preferably,
when the LISP network is an IPv6 network, and when the mobile node obtains the address through a stateless address allocation mode, the method comprises:

when the mobile node accesses a new link, sending a routing request message carrying a third option, wherein, the third option comprises attribute information of which a value represents globally routable, and a destination address of the message is a multicast group formed by all routers;

a router receiving the routing request message preferentially selecting globally routable routing prefixes from available routing prefix resources configured locally, and then replying with a routing advertise message carrying the selected routing prefix to the mobile node; and the mobile node selecting one of the received globally routable routing prefixes to combine with an interface identification of itself as a location identifier of itself.

Preferably,
the routing prefixes selected by the router are part or all of routing prefixes in the available routing prefix resources configured locally.

Preferably,
when the LISP network is an IPv6 network, and when the mobile node obtains the address through a stateful address allocation mode, the method comprises:

when the mobile node moves to a new location, sending a SOLICIT message carrying a fourth option, wherein, the fourth option comprises attribute information of which a value represents globally routable, and a destination address of the message is a multicast group formed by all DHCPv6 servers and DHCPv6 relays; and the DHCPv6 server receiving the solicit message preferentially selecting globally routable addresses from available address resources configured locally, and then replying with an advertise message carrying the selected address to the mobile node.

Preferably, the method further comprises:
the mobile node selecting one of received addresses as a location identifier of itself, and then sending a REQUEST message to an allocator DHCPv6 server of the selected address, wherein, the message carries the selected address and attribute information of the selected address.

Correspondingly, the embodiment of the present document further provides a locator/ID separation protocol (LISP) network, comprising a mobile node and an address information allocation device, wherein, the mobile node is configured to: when moving to a new location, send an address information allocation request carrying a first option to the address information allocation device, wherein, the first option comprises attribute information of which a value represents globally routable; and the address information allocation device is configured to: after receiving the address information allocation request, preferentially select globally routable address information in locally available address information resources, and then reply with an address information allocation response carrying the selected address information to the mobile node, wherein, the address information comprises an address or a routing prefix.

Preferably,
the address information allocation response also carries attribute information of the selected address information.

Preferably,
the mobile node is further configured to construct a location identifier of itself by utilizing received address information allocated by the address information allocation device for the mobile node.

Preferably,
when the LISP network is an IPv4 network, and when the mobile node is configured to interact with the address information allocation device by adopting a point-to-point protocol, the address information allocation request is a network control protocol configuration request, the address information allocation response is a network control protocol configuration response, and the address information allocation device is a correspondent Node which performs point-to-point protocol communication with the mobile node.

Preferably, when the LISP network is an IPv4 network, and when the mobile node interacts with the address information allocation device by adopting a dynamic host configuration protocol (DHCP):

the mobile node is configured to: when moving to a new location, broadcast a DHCPDISCOVER message carrying a second option, wherein, the second option comprises attribute information of which a value represents globally routable; and a DHCP server receiving the DHCP discover message, as the address information allocation device, is configured to preferentially select globally routable addresses from available address resources configured locally, and then reply with a DHCPOFFER message carrying the selected address to the mobile node.

Preferably, the mobile node is further configured to select one of received addresses as a location identifier of itself, and then broadcast a DHCPREQUEST message which carries identification information of an allocator DHCP server of the selected address, the selected address, and attribute information of the selected address.

Preferably, when the LISP network is an IPv6 network, and when the mobile node obtains the address through a stateless address allocation mode:

the mobile node is configured to: when accessing a new link, send a routing request message carrying a third option, wherein, the third option comprises attribute information of which a value represents globally routable, and a destination address of the message is a multicast group formed by all routers; and select one of received globally routable routing prefixes to combine with an interface identification of itself as a location identifier of itself; and a router receiving the routing request message, as the address information allocation device, is configured to preferentially select globally routable routing prefixes from available routing prefix resources configured locally, and then reply with a routing advertise message carrying the selected routing prefix to the mobile node.

Preferably, the routing prefixes selected by the router are part or all of routing prefixes in the available routing prefix resources configured locally.

Preferably, when the LISP network is an IPv6 network, and when the mobile node obtains the address through a stateful address allocation mode:

the mobile node is configured to: when moving to a new location, send a SOLICIT message carrying a fourth option, wherein, the fourth option comprises attribute information of which a value represents globally routable, and a destination address of the message is a multicast group formed by all DHCPv6 servers and DHCPv6 relays; and the DHCPv6 server receiving the solicit message, as the address information allocation device, is configured to preferentially select globally routable addresses from available address resources configured locally, and then reply with an advertise message carrying the selected address to the mobile node.

Preferably, the mobile node is further configured to select one of received addresses as a location identifier of itself, and then send a request message to a allocator DHCPv6 server of the selected address, wherein, the message carries the selected address and attribute information of the selected address.

The embodiment of the present document further provides an address information allocation device in a locator/ID separation protocol (LISP) network, configured to:

receive an address information allocation request carrying a first option sent by a mobile node, wherein, the first option comprises attribute information of which a value represents globally routable; and preferentially select globally routable address information in locally available address information resources, and then reply with an address information allocation response carrying the selected address information to the mobile node, wherein, the address information comprises an address or a routing prefix.

Preferably, the address information allocation response also carries attribute information of the selected address information.

By adopting the scheme of the embodiment of the present document, the LISP MN can configure the globally routable address as the location identifier. When the correspondent Node is communicated with the MN, it is only needed to perform one mapping searching and perform one LISP encapsulation on the data message.

PREFERRED EMBODIMENTS OF THE INVENTION

The embodiment of the present document is described in detail with reference to the accompanying drawings hereinafter. It should be illustrated that, in the case of not conflicting, the embodiments in the present application and features in these embodiments can be combined with each other arbitrarily.

Figure 1:
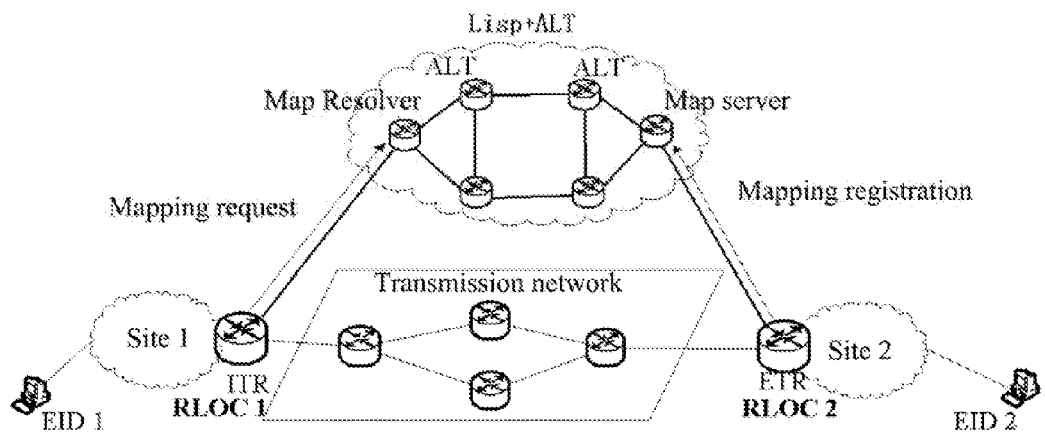
FIG. 1 is a diagram of a network framework of LISP+ALT in the related art.
Figure 2:
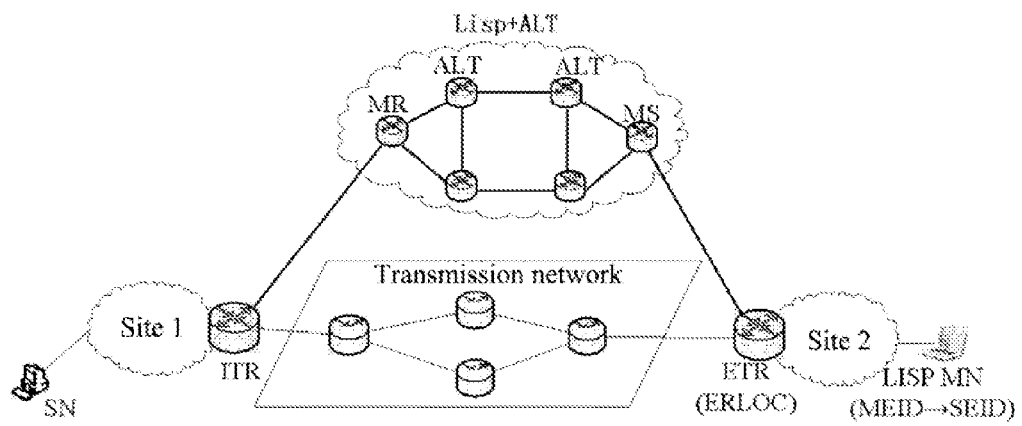
FIG. 2 is a scene diagram of an LISP MN obtaining an SEID as a location identifier in the network shown in FIG. 1.
Figure 3:
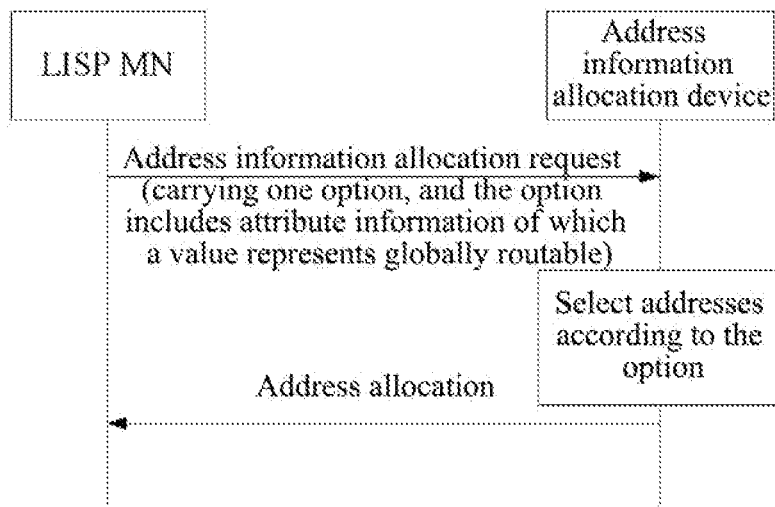
FIG. 3 is a flow chart of an LISP MN dynamically obtaining a location identifier according to an embodiment of the present document.

In the present embodiment, a method for a locator/ID separation protocol (LISP) mobile node (MN) dynamically obtaining a location identifier is provided based on an LISP network framework and protocol, as shown in FIG. 3, including:

when the LISP MN moves to a new location, sending an address information allocation request carrying a first option to an address information allocation device, wherein, the first option includes attribute information of which a value represents globally routable; and after receiving the above-mentioned address information allocation request, the address information allocation device preferentially selecting attribute information of which a value represents globally routable address information in available address information resources configured locally to allocate to the above-mentioned MN, wherein, the address information described in the text includes an address or a routing prefix.

In addition, besides sending the selected address information to the above-mentioned MN, the attribute value of the selected address information can also be sent to the MN together.

In the present embodiment, the local resource pool is divided by the address information allocation device according to different attributes of the local address or the routing prefix in advance, and the address information allocation device can recognize the value of the attribute information carried in the address information allocation request, and can allocate an appropriate address or routing prefix to the LISP MN based on the strategy. In principle, except the address information set apart as the dedicated address or routing prefix in advance, all other address information can be set apart as the globally routable address information.

By using the above-mentioned method, the MN can utilize the obtained globally routable address information to form the location identifier, which avoids the extra overhead of the control plane and the data plane possibly caused when using the address information which is not globally routable to form the location identifier.

Figure 4:
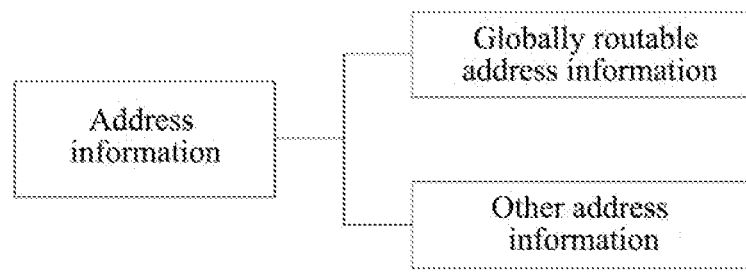
FIG. 4 is address pool configuration in an address information allocation device according to an embodiment of the present document.

As shown in FIG. 4, based on the embodiment of the present document, the information of the address resource pool in the address information allocation device is classified as follows:

the globally routable address information (including the globally routable address or the globally routable routing prefix): the address information allocation device can announce the routing information of the globally routable address information to a routing list of an Internet Default Forward Zone (DFZ), and the transmission network can finish the forwarding of the data package pointing to the address according to the routing information;

other addresses/routing prefix types: including an EID address or routing prefix which cannot be globally routable, a RFC 1918 address or a routing prefix, etc., used as the identifier in the LISP mechanism, and the address information will not be announced to the routing list of the Internet DFZ.

The classification about the above-mentioned two kinds of the address information is only an example. The address information can further be subdivided by the address information allocation device according to the actual conditions, so long as the set-apart address information includes the globally routable address.

It is illustrated by using several examples of the present document hereinafter.

Application Example One

Figure 5:
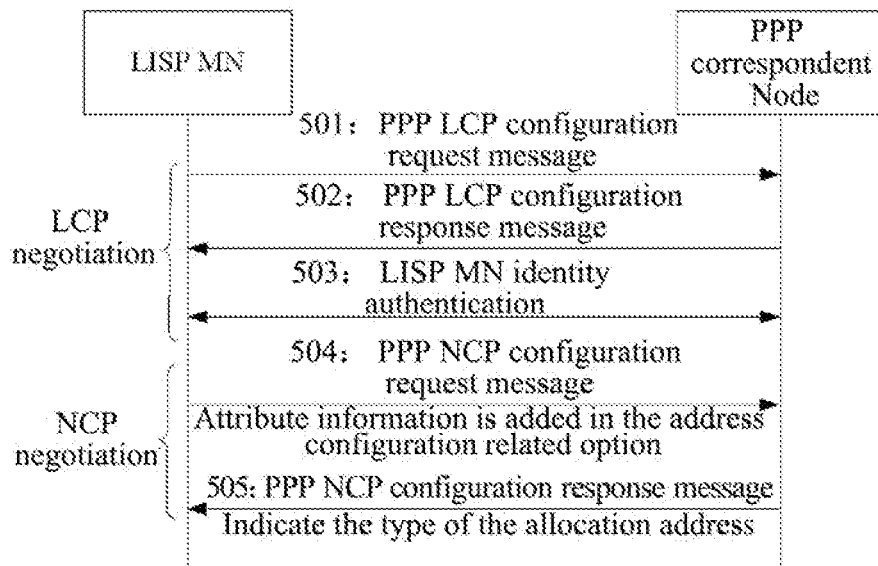
FIG. 5 is a flow chart of an LISP MN obtaining a location identifier based on a PPP mechanism in an IPv4 scene according to an embodiment of the present document.

FIG. 5 shows a flow chart of the LISP MN dynamically obtaining a location identifier based on the Point-to-Point Protocol (PPP) in the IPv4 network. Under this scene, a PPP correspondent Node of the LISP MN, for example, a Broadband Remote Access Server (BRAS) device, as the address information allocation device, allocates the address constructing the location identifier for it.

On the basis of the PPP protocol, after the LISP MN accesses a point-to-point link, two parts of protocol negotiations need to be finished: a Link Control Protocol (LCP) negotiation and a Network Control Protocol (NCP) negotiation. The LCP protocol is used for establishing, configuring and detecting the data link layer connection, and the NCP protocol is used for establishing and configuring different network layer protocols. The location identifier of the LISP MN can be obtained during the NCP negotiation process.

As shown in FIG. 5, the LCP negotiation procedure includes the following steps:

in 501: the LISP MN sends an LCP configuration request message to the correspondent Node;

in 502: the correspondent Node returns to an LCP configuration response message to the LISP MN;

in 503: an identity authentication process of the LISP MN is executed.

Wherein, the identity authentication in the 503 is an optional operation, and this authentication process can be initiated by the correspondent Node and also can be initiated actively by the MN.

In the present example, the negotiation procedure of the LISP MN based on the PPP protocol is same as that of the related art.

After the LCP negotiation is finished, the LISP MN turn to the NCP negotiation stage:

in 504: the LISP MN sends an NCP configuration request message to the correspondent Node, the attribute information is added in the carried address configuration option, and the value of the attribute information represents globally routable, and is used for indicating that the address requested and obtained by the MN is a globally routable address;

in 505: correspondent Node preferentially searches for the globally routable addresses in the available address of the local address resource pool after receiving the NCP configuration request message; if there is no globally routable address, selects other types of addresses, and then returns the NCP configuration response message carrying the address allocated for the MN and the attribute information of the address to the LISP MN, wherein, the value of the attribute information is used for representing the type of the address allocated for the MN.

Application Example Two

Figure 6:
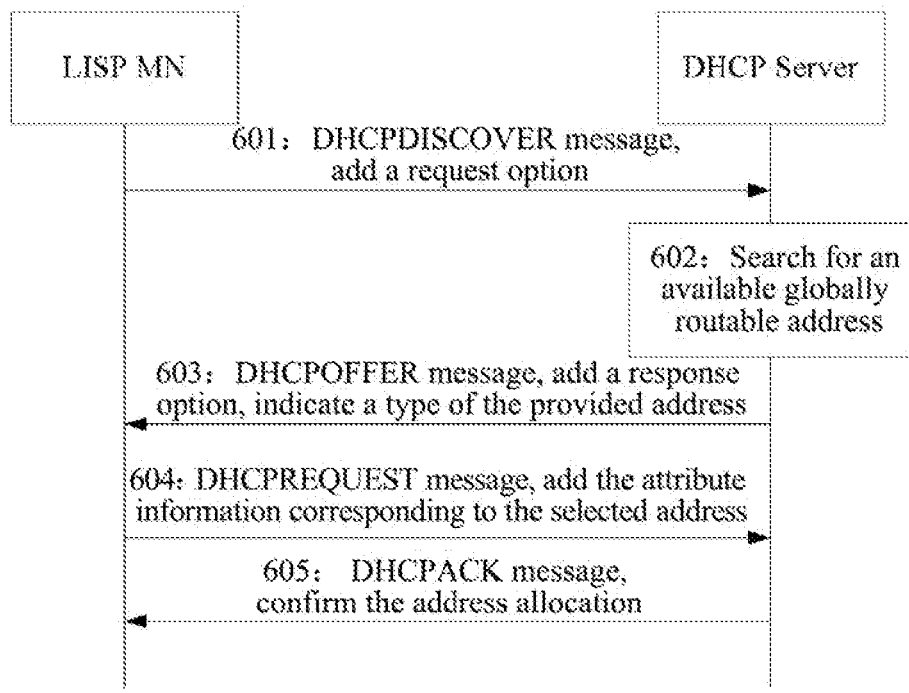
FIG. 6 is a flow chart of an LISP MN obtaining a location identifier based on a DHCP mechanism in an IPv4 scene according to an embodiment of the present document.

FIG. 6 shows a flow chart of the LISP MN dynamically obtaining a location identifier based on the Dynamic Host Configuration Protocol (DHCP) in the IPv4 network. Under this scene, the address information allocation device is a DHCP server. The procedure of obtaining the location identifier of the LISP MN is as follows:

in 601: the LISP MN moves to a new location, broadcasts the DHCPDISCOVER message, the message carries an option including the attribute information of which the value represents globally routable and it is used for indicating to the DHCP Server that the address requested and obtained by the MN is the globally routable address;

in 602: the DHCP Server receiving the DHCPDISCOVER message sent by the LISP MN preferentially searches for whether there is an available globally routable address in the address pool according to the value of the attribute information carried in the message; if yes, the globally routable address is allocated for the MN; otherwise, other types of addresses are allocated for the MN;

in 603: the DHCP Server returns the DHCPOFFER message back to the LISP MN, wherein, the message carries the address allocated for the LISP MN by the DHCP server and one option, wherein, the option includes the attribute information of which the value is used for representing the type of the address allocated for the MN;

in 604: the LISP MN broadcasts the DHCPREQUEST message, and the message carries the identification information of the DHCP Server selected by the present MN, the address allocated for it by the selected DHCP Server and the attribute information of the address;

in 605: the corresponding DHCP Server replies with the DHCPACK message to the LISP MN, to confirm the address allocation.

In the above-mentioned process, if the LISP MN and the DHCP Server are not in a same network segment, the message interacted between the two may need to be forwarded through the DHCP relay. The DHCP relay is transparent to the LISP MN, and will not change the information carried in the message, so the processing procedure of the DHCP relay will not go into detail here.

Application Example Three

Figure 7:
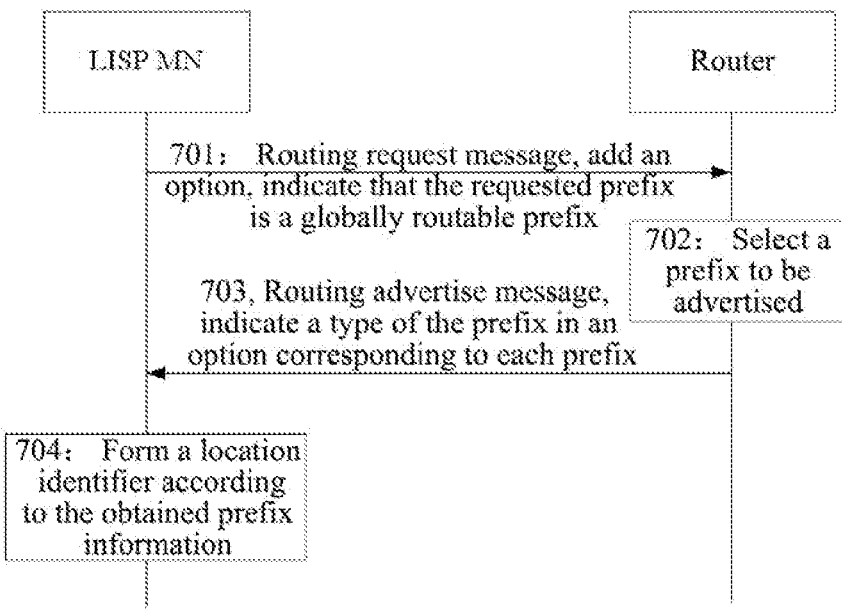
FIG. 7 is a flow chart of an LISP MN obtaining a location identifier based on a stateless address allocation mechanism in an IPv6 scene according to an embodiment of the present document.

FIG. 7 shows a flow chart of the LISP MN dynamically obtaining a location identifier through the stateless address allocation mode in the IPv6 network. Under this scene, the LISP MN obtains the routing prefix information from the router on the link, and combines the routing prefix with its own interface identifier to form the required location identifier. Therefore, under this scene, the router is the address information allocation device. The procedure of obtaining the location identifier of the LISP MN is as follows:

in 701: the LISP MN accesses the new link (moving to a new location, in other words), obtains the interface identifier, and then sends a routing request message, and a destination address of the message is a multicast group formed by all routers. The MN adds one option into the message, and the option includes the attribute information, and the value of the attribute information represents globally routable, and it is used for indicating to DHCP Server that the address requested and obtained by the MN is the globally routable routing prefix;

in 702: the router in the link preferentially selects the globally routable routing prefixes in the prefix list according to the attribute information carried in the message after receiving the routing request message sent by the LISP MN; alternatively, the router can also select all routing prefixes in the prefix list;

in 703: the router returns a routing advertise message to the LISP MN, wherein, the message carries the routing prefix selected by the router and the attribute information of the routing prefix;

in 704: after receives the routing advertise message, in combination with the interface identifier, the LISP MN forms the required location identifier according to the routing prefix carried in the message. If there are multiple routing prefixes carried in the routing advertise message, then the MN needs to select one of them after receiving the message, and then combines the routing prefix with the interface identifier to form the required location identifier.

Application Example Three

Figure 8:
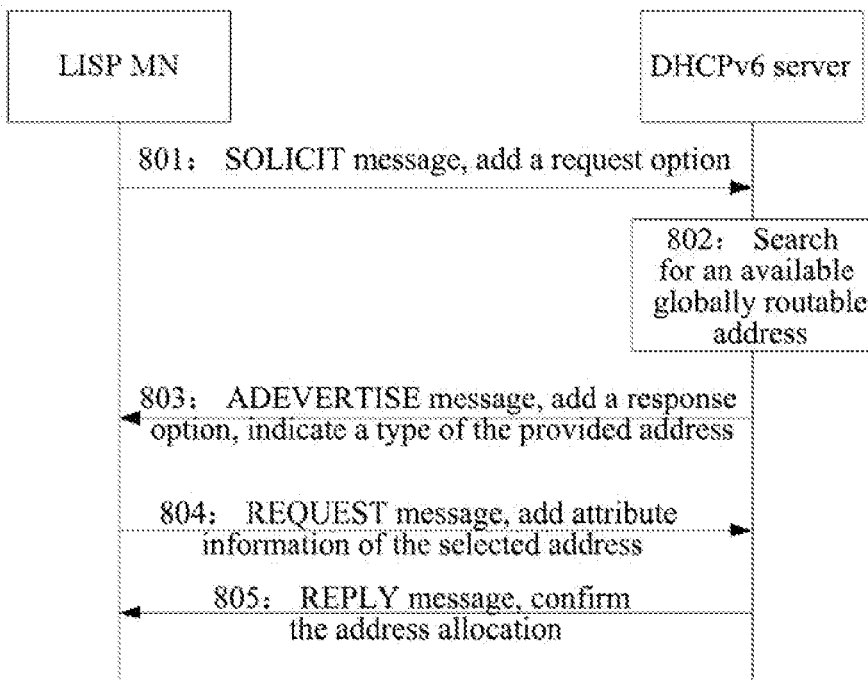
FIG. 8 is a flow chart of an LISP MN obtaining a location identifier based on a DHCPv6 mechanism in an IPv6 scene according to an embodiment of the present document.

FIG. 8 shows a flow chart of the LISP MN dynamically obtaining a location identifier through the stateful address allocation mode in the IPv6 network, that is, the flow chart of dynamically obtaining a location identifier when the mobile node interacts with the address allocation device through the dynamic host configuration protocol in the IPv6 network (DHCPv6). Under this scene, the address allocation device that allocates the location identifier to the LISP MN is a DHCPv6 server. The procedure of obtaining the location identifier of the LISP MN is as follows:

in 801: the LISP MN moves to a new location and sends the SOLICIT multicast message, and the destination address of the message corresponds to the multicast group consisted of the DHCPv6 Server and the DHCPv6 relay. The message carries an option, and the option includes the attribute information of which the value represents globally routable, it is used for indicating to DHCPv6 Server that the address requested and obtained by the MN is a globally routable address;

in 802: the DHCPv6 Server searches for whether there is an available globally routable address in the local address resource pool according to the attribute information carried in the message after receiving the SOLICIT message sent by the LISP MN; if yes, the globally routable address is allocated for the MN; otherwise, other types of addresses are allocated for the MN;

in 803: the DHCPv6 Server returns an ADEVERTISE message to the LISP MN, wherein, the message carries the address allocated for the LISP MN by the server and the attribute information of the address; wherein, the attribute information can be included in one option of the ADEVERTISE message;

in 804: LISP MN sends the REQUEST message to the selected DHCPv6 Server, and the message carries the address allocated for it by the DHCPv6 server and the attribute information of the address; wherein, the attribute information can be included in one option of the REQUEST message;

in 805: the DHCPv6 Server replies with the REPLY message to the LISP MN to confirm the address allocation.

In the above-mentioned process, if the LISP MN and the DHCPv6 Server are not in a same network segment, the messages interacted between the above two may need to be forwarded through the DHCPv6 relay. The DHCPv6 relay is transparent for the LISP MN, and will not change the information carried in the message, therefore the processing procedure of the DHCPv6 relay will not go into detail here.

In the present embodiment, a locator/ID separation protocol (LISP) network includes a mobile node and an address information allocation device, wherein, the mobile node is configured to: when moving to a new location, send an address information allocation request carrying a first option to the address information allocation device, wherein, the first option comprises attribute information of which a value represents globally routable; and the address information allocation device is configured to: after receiving the address information allocation request, preferentially select globally routable address information in locally available address information resources, and then reply with an address information allocation response carrying the selected address information to the mobile node, wherein, the address information includes an address or a routing prefix.

Preferably, the address information allocation response also carries attribute information of the selected address information.

Preferably, the mobile node is further configured to construct its own location identifier by utilizing the received address information allocated by the address information allocation device.

Preferably, when the LISP network is an IPv4 network, and when the mobile node is configured to interact with the address information allocation device by adopting a point-to-point protocol, the address information allocation request is a network control protocol configuration request, the address information allocation response is a network control protocol configuration response, and the address information allocation device is a correspondent Node which performs point-to-point protocol communication with the mobile node.

Preferably, when the LISP network is an IPv4 network, and when the mobile node interacts with the address information allocation device by adopting a dynamic host configuration protocol (DHCP):

the mobile node is configured to: when moving to the new location, broadcast a DHCPDISCOVER message carrying a second option, wherein, the second option comprises attribute information of which a value represents globally routable; and a DHCP server receiving the DHCP discover message, as the address information allocation device, is configured to preferentially select globally routable addresses from available address resources configured locally, and then reply with a DHCPOFFER message carrying the selected address to the mobile node.

Preferably, the mobile node is further configured to select one of received addresses as its own location identifier, and then broadcast a DHCPREQUEST message which carries identification information of an allocator DHCP server of the selected address, the selected address, and attribute information of the selected address.

Preferably, when the LISP network is an IPv6 network, and when the mobile node obtains the address through a stateless address allocation mode:

the mobile node is configured to: when accessing a new link, send a routing request message carrying a third option, wherein, the third option comprises attribute information of which a value represents globally routable, and a destination address of the message is a multicast group formed by all routers; and is further configured to select one of received globally routable routing prefixes to combine with its own interface identification as its own location identifier; and a router receiving the routing request message, as the address information allocation device, is configured to preferentially select globally routable routing prefixes from available routing prefix resources configured locally, and then reply with a routing advertise message carrying the selected routing prefix to the mobile node.

Preferably, the routing prefixes selected by the router are part or all of routing prefixes in the available routing prefix resources configured locally.

Preferably, when the LISP network is an IPv6 network, and when the mobile node obtains the address through a stateful address allocation mode:

the mobile node is configured to: when moving to a new location, send a SOLICIT message carrying a fourth option, wherein, the fourth option comprises attribute information of which a value represents globally routable, and a destination address of the message is a multicast group formed by all DHCPv6 servers and DHCPv6 relays; and the DHCPv6 server receiving the solicit message, as the address information allocation device, is configured to preferentially select globally routable addresses from available address resources configured locally, and then reply with an advertise message carrying the selected address to the mobile node.

Preferably, the mobile node is further configured to select one of received addresses as its own location identifier, and then send a request message to a allocator DHCPv6 server of the selected address, wherein, the message carries the selected address and attribute information of the selected address.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limit to any specific form of the combination of the hardware and software.

The above description is only for the preferred embodiments of the present document and is not intended to limit the scope of the present document. There can be a variety of other embodiments according to the summary of the present document. Those skilled in the art can make the corresponding modifications and variations according to the present document without departing from the spirit and essence of the present document, and all of these modifications or the variations should be embodied in the scope of the appended claims of the present document.

INDUSTRIAL APPLICABILITY

By adopting the scheme of the embodiment of the present document, the LISP MN can configure a globally routable address as a location identifier. When a correspondent Node communicates with the MN, it only needs to perform mapping searching once and perform LISP encapsulation once on the data message.

What is claimed is:

1. A method for a mobile node dynamically obtaining a location identifier, applied in a locator/ID separation protocol (LISP) network, comprising:

when a mobile node moves to a new location, sending an address information allocation request carrying an option to an address information allocation device which announces routing information of globally routable address information to a routing list of an Internet Default Forward Zone (DFZ), wherein, the option comprises attribute information of which a value represents globally routable; and after receiving the address information allocation request, the address information allocation device preferentially selecting the globally routable address information in locally available address information resources, and then replying with an address information allocation response carrying the selected address information to the mobile node, wherein, the address information comprises an address or a routing prefix;

when a correspondent node, a location of which is not usually changed in regard to the mobile node, sends a data package of which a destination address is an Endpoint Identifier of the mobile node (MEID), performing mapping searching only once to find the globally routable address information of the mobile node, and performing LISP encapsulation once on the data package.

2. The method according to claim 1, wherein,
the address information allocation response also carries attribute information of the selected address information.

3. The method according to claim 1, further comprising:
the mobile node constructing a location identifier of itself by utilizing the address information carried by the received address information allocation response.

4. The method according to claim 1, wherein,
when the LISP network is an IPv4 network, and when the mobile node interacts with the address information allocation device by adopting a point-to-point protocol, the address information allocation request is a network control protocol configuration request, the address information allocation response is a network control protocol configuration response, and the address information allocation device is the correspondent device which performs point-to-point protocol communication with the mobile node.

5. The method according to claim 1, wherein,
when the LISP network is an IPv4 network, and when the mobile node interacts with the address information allocation device by adopting a dynamic host configuration protocol (DHCP), the method comprises:
when the mobile node moves to a new location, broadcasting a DHCP discover message carrying the option; and
a DHCP server which receives the DHCP discover message preferentially selecting globally routable addresses from available address resources configured locally, and then replying with a DHCP offer message carrying one or more selected addresses to the mobile node.

6. The method according to claim 5, further comprising:
the mobile node selecting one of the received addresses as a location identifier of the mobile node, and then broadcasting a DHCP request message which carries identification information of an allocator DHCP server of the selected address, the selected address, and attribute information of the selected address.

7. The method according to claim 1, wherein,
when the LISP network is an IPv6 network, and when the mobile node obtains the address through a stateless address allocation mode, the method comprises:
the mobile node obtaining routing prefix information from routers on a link,
when the mobile node accesses a new link, sending a routing request message carrying the option, wherein, a destination address of the message is a multicast group formed by all routers;
a router which receives the routing request message preferentially selecting globally routable routing prefixes from available routing prefix resources configured locally, and then replying with a routing advertise message carrying the selected routing prefix to the mobile node; and
the mobile node selecting one of the received globally routable routing prefixes to combine with an interface identification of itself as a location identifier of itself.

8. The method according to claim 7, wherein,
the routing prefixes selected by the router are part or all of routing prefixes in the available routing prefix resources configured locally.

9. The method according to claim 1, wherein,
when the LISP network is an IPv6 network, and when the mobile node obtains the address through a stateful address allocation mode, the method comprises:
when the mobile node moves to a new location, sending a solicit message carrying the option to DHCPv6 servers in the IPv6 network which also includes DHCPv6 relays, wherein, a destination address of the message is a multicast group formed by all DHCPv6 servers and DHCPv6 relays; and
the DHCPv6 server which receives the solicit message preferentially selecting globally routable addresses from available address resources configured locally, and then replying with an advertise message carrying the selected address to the mobile node.

10. The method according to claim 9, further comprising:
the mobile node selecting one of received addresses as a location identifier of itself, and then sending a REQUEST message to an allocator DHCPv6 server of the selected address, wherein, the message carries the selected address and attribute information of the selected address.

11. A locator/ID separation protocol (LISP) network, comprising a mobile node, a correspondent node a location of which is not usually changed in regard to the mobile node, and an address information allocation device which announces routing information of globally routable address information to a routing list of an Internet Default Forward Zone (DFZ), wherein,
the mobile node is configured to: when moving to a new location, send an address information allocation request carrying an option to the address information allocation device, wherein, the option comprises attribute information of which a value represents globally routable; and
the address information allocation device is configured to: after receiving the address information allocation request, preferentially select the globally routable address information in locally available address information resources, and then reply with an address information allocation response carrying the selected address information to the mobile node, wherein, the address information comprises an address or a routing prefix;
the correspondent node is configured to: when sending a data package of which a destination address is an Endpoint Identifier of the mobile node (MEID), perform mapping searching only once to find the globally routable address information of the mobile node, and perform LISP encapsulation once on the data package.

12. The network according to claim 11, wherein,
the address information allocation response also carries attribute information of the selected address information.

13. The network according to claim 11, wherein,
the mobile node is further configured to construct a location identifier of itself by utilizing the address information carried by the received address information allocation response.

14. The network according to claim 11, wherein,
when the LISP network is an IPv4 network, and when the mobile node is configured to interact with the address information allocation device by adopting a point-to-point protocol, the address information allocation request is a network control protocol configuration request, the address information allocation response is a network control protocol configuration response, and the address information allocation device is the correspondent device which performs point-to-point protocol communication with the mobile node.

15. The network according to claim 11, wherein, when the LISP network is an IPv4 network, and when the mobile node interacts with the address information allocation device by adopting a dynamic host configuration protocol (DHCP);

the mobile node is configured to: when moving to a new location, broadcast a DHCPDISCOVER message carrying the option; and a DHCP server which receives the DHCP discover message, as the address information allocation device, is configured to preferentially select globally routable addresses from available address resources configured locally, and then reply with a DHCPOFFER message carrying one or more selected addresses to the mobile node.

16. The network according to claim 15, wherein:

the mobile node is further configured to select one of the received addresses as a location identifier of the mobile node, and then broadcast a DHCPREQUEST message which carries identification information of an allocator DHCP server of the selected address, the selected address, and attribute information of the selected address.

17. The network according to claim 11, wherein, when the LISP network is an IPv6 network, and when the mobile node obtains the address through a stateless address allocation mode;

the mobile node is configured to: obtaining routing prefix information from routers on a link; and when accessing anew link, send a routing request message carrying the option, wherein, a destination address of the message is a multicast group formed by all routers;

a router receiving the routing request message, as the address information allocation device, is configured to preferentially select globally routable routing prefixes from available routing prefix resources configured locally, and then reply with a routing advertise message carrying the selected routing prefix to the mobile node, wherein, the routing prefixes selected by the router are part or all of routing prefixes in the available routing prefix resources configured locally.

18. The network according to claim 11, wherein, when the LISP network is an IPv6 network, and when the mobile node obtains the address through a stateful address allocation mode:

the mobile node is configured to: when moving to a new location, send a SOLICIT message carrying the option to DHCPv6 servers in the IPv6 network which also includes DHCPv6 relays, wherein, a destination address of the message is a multicast group formed by all DHCPv6 servers and DHCPv6 relays; and the DHCPv6 server receiving the solicit message, as the address information allocation device, is configured to preferentially select globally routable addresses from available address resources configured locally, and then reply with an advertise message carrying the selected address to the mobile node, wherein, the mobile node is further configured to select one of received addresses as a location identifier of itself, and then send a request message to a allocator DHCPv6 server of the selected address, wherein, the message carries the selected address and attribute information of the selected address.

19. An address information allocation device in a locator/ID separation protocol (LISP) network which announces routing information of globally routable address information to a routing list of an Internet Default Forward Zone (DFZ), configured to:

receive an address information allocation request carrying an option sent by a mobile node, wherein, the option comprises attribute information of which a value represents globally routable; and preferentially select the globally routable address information in locally available address information resources, and then reply with an address information allocation response carrying the selected address information to the mobile node, wherein, the address information comprises an address or a routing prefix; and when a correspondent node, a location of which is not usually changed in regard to the mobile node, sends a data package of which a destination address is an End-point Identifier of the mobile node (MEID), the correspondent node performing mapping searching only once to find the globally routable address information of the mobile node, and performing LISP encapsulation once on the data package.

20. The device according to claim 19, wherein, the address information allocation response also carries attribute information of the selected address information.

* * * * *